US010801320B2

(12) United States Patent
Gray

(10) Patent No.: US 10,801,320 B2
(45) Date of Patent: Oct. 13, 2020

(54) METHODS AND SYSTEMS FOR DOWNHOLE INDUCTIVE COUPLING

(71) Applicant: Halliburton Energy Services, Inc., Houston, TX (US)

(72) Inventor: Steven K. Gray, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/778,386

(22) PCT Filed: Dec. 20, 2016

(86) PCT No.: PCT/US2016/067844
§ 371 (c)(1),
(2) Date: May 23, 2018

(87) PCT Pub. No.: WO2018/118028
PCT Pub. Date: Jun. 28, 2018

(65) Prior Publication Data
US 2019/0136687 A1 May 9, 2019

(51) Int. Cl.
*E21B 47/13* (2012.01)
*E21B 47/01* (2012.01)
*E21B 17/02* (2006.01)
*H04B 5/00* (2006.01)

(52) U.S. Cl.
CPC ............ *E21B 47/13* (2020.05); *E21B 17/023* (2013.01); *E21B 47/01* (2013.01); *H04B 5/0075* (2013.01)

(58) Field of Classification Search
CPC .................................................... E21B 47/122
See application file for complete search history.

(56) References Cited

U.S. PATENT DOCUMENTS

| 4,901,069 A | 2/1990 | Veneruso |
| 5,052,941 A | 10/1991 | Hernandez-Marti et al. |
| 5,971,072 A | 10/1999 | Huber et al. |

(Continued)

FOREIGN PATENT DOCUMENTS

| GB | 2407334 | 4/2005 |
| GB | 2502616 | 4/2018 |
| WO | 2010037729 A1 | 4/2010 |

OTHER PUBLICATIONS

International Search Report and Written Opinion of PCT Application No. PCT/US2016/067844 dated Sep. 6, 2017: pp. 1-18.

*Primary Examiner* — Amine Benlagsir
(74) *Attorney, Agent, or Firm* — Chamberlain Hrdlicka

(57) ABSTRACT

A downhole inductive coupling system, a method of deploying an electrically connected system downhole, and a method of transmitting electrical signals between downhole components. The downhole inductive coupling system comprises a cable, a cable inductive coupler, a downhole electrical device, and a device inductive coupler. The cable inductive coupler is electrically and mechanically coupled to an end of the cable and pressure sealed to the cable. The device inductive coupler is electrically and mechanically coupled to the electrical device and pressure sealed to the downhole device. The cable inductive coupler and the device inductive coupler are inductively coupleable with each other, such that the cable is in wireless communication with the downhole electrical device via the cable inductive coupler and the device inductive coupler.

15 Claims, 6 Drawing Sheets

(56) References Cited

U.S. PATENT DOCUMENTS

| | | | |
|---|---|---|---|
| 7,040,003 | B2 | 5/2006 | Hall et al. |
| 7,098,767 | B2 | 8/2006 | Hall et al. |
| 7,735,555 | B2 | 6/2010 | Patel et al. |
| 8,988,178 | B2 | 3/2015 | Deville et al. |
| 2006/0022839 | A1 | 2/2006 | Hall et al. |
| 2007/0257812 | A1* | 11/2007 | Lasater ............... E21B 47/12 340/854.8 |
| 2009/0078425 | A1* | 3/2009 | Wajnikonis ......... E21B 17/015 166/367 |
| 2009/0078426 | A1* | 3/2009 | Blaquiere ........... E21B 43/126 166/369 |
| 2010/0300678 | A1 | 12/2010 | Patel et al. |
| 2011/0107834 | A1* | 5/2011 | Howard ............... E21B 17/028 73/431 |
| 2011/0284216 | A1* | 11/2011 | Addis ................. E21B 47/01 166/250.01 |
| 2013/0186641 | A1 | 7/2013 | Lovell |
| 2013/0319685 | A1 | 12/2013 | Pike |
| 2014/0266210 | A1* | 9/2014 | Godager ............... G01V 3/34 324/323 |

* cited by examiner

METHODS AND SYSTEMS FOR DOWNHOLE INDUCTIVE COUPLING

BACKGROUND

This section is intended to provide relevant contextual information to facilitate a better understanding of the various aspects of the described embodiments. Accordingly, it should be understood that these statements are to be read in this light and not as admissions of prior art.

Oil and gas wells are typically instrumented with various sensors downhole to measure various conditions of the downhole environment and/or well parameters such as temperature, pressure, vibration, cable fault, position and orientation, flow, density, among others. These sensors are placed downhole adjacent to production tubing or drill pipe as and coupled uphole via a cable. Thus, the sensors are connected to the cable as the tubing or pipe is run downhole.

During a run-in-hole operation, a downhole tubing string is built by lowering a tubing string downhole, connecting another tubing segment uphole of the previous tubing segment, thereby adding length to the tubing string, and then lowering the tubing string further downhole. Additional tubing segments are added this way until the desire depth is reached. Currently, this run-in-hole process must be paused in order to install and sensors onto the tubing string and test the connections. Specifically, the cable head of the cable is physically connected to the sensor and a pressure test may be performed. This is done at the surface, in which the run-in-hole operation is paused in order to install the sensor onto the tubing string, connect the cable head to the sensor, and pressure test the connection between the sensor and the cable head. Only after the connection is completed and passes pressure testing is the run-in-hole operation started again, lowering the tubing or pipe further downhole. This process takes up a significant amount of time, and slows the run-in-hole operation, thereby increasing overall rig time and costs.

BRIEF DESCRIPTION OF THE DRAWINGS

Embodiments of the invention are described with reference to the following figures. The same numbers are used throughout the figures to reference like features and components. The features depicted in the figures are not necessarily shown to scale. Certain features of the embodiments may be shown exaggerated in scale or in somewhat schematic form, and some details of elements may not be shown in the interest of clarity and conciseness.

DETAILED DESCRIPTION

The present disclosure provides a downhole electrical connection system that utilizes inductive coupling to transmit power and/or data between two or more downhole components, such as between a cable and a gauge. Since inductive coupling does not require a physical connection to be made, there is no pressure testing required between the two components, which decreases the amount of time needed to run the system downhole.

Figure 1:
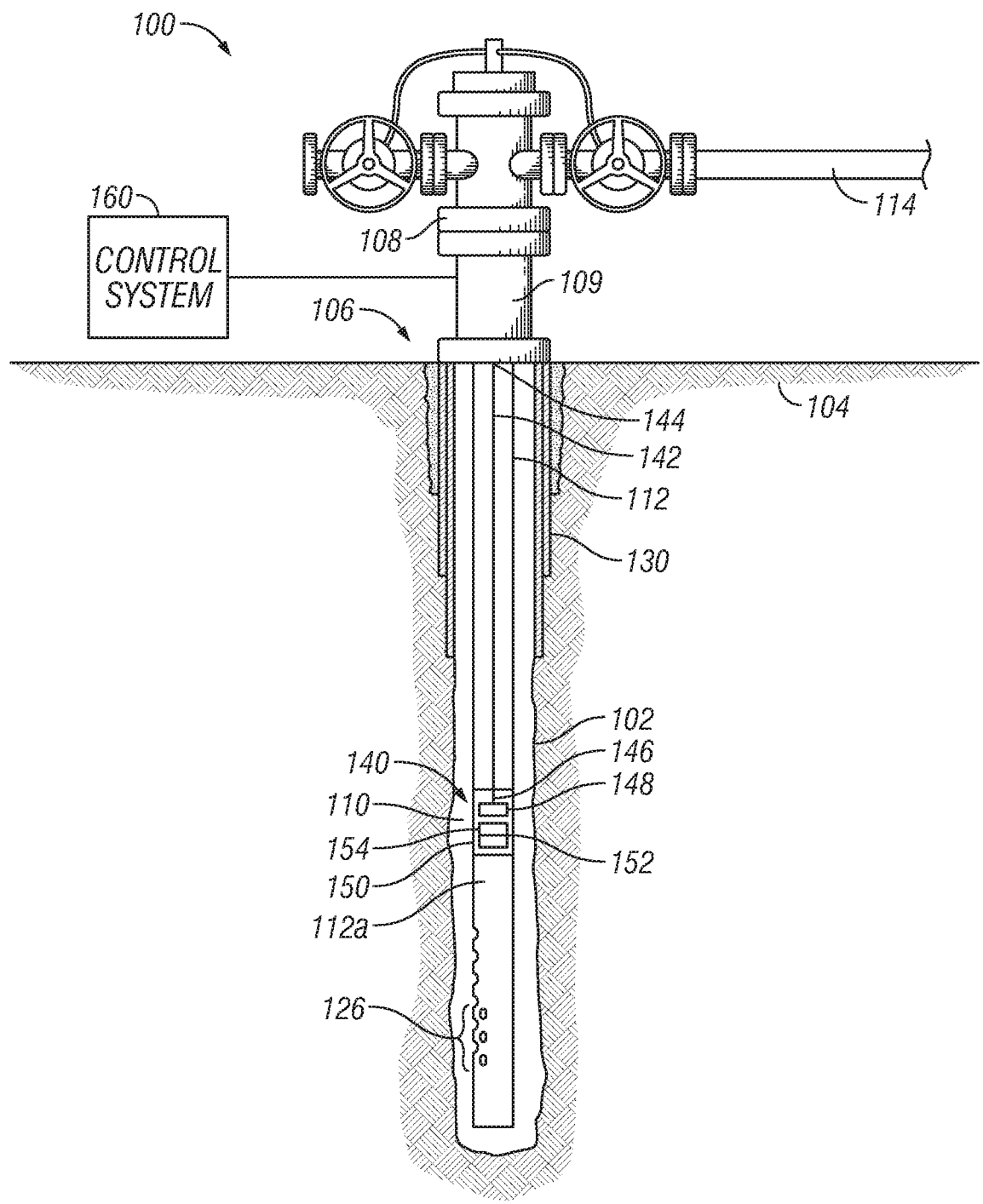
FIG. 1 shows an elevation view an example production well system with inductive coupling between downhole electrical components, in accordance with one or more embodiments.

Referring now to the figures, FIG. 1 shows an elevation view of an example production well system 100 with induction coupling between downhole electrical components, in accordance with one or more embodiments. As shown, the well system 100 includes a well 102 formed within a formation 104. The well 102 may be a vertical wellbore as illustrated or it may be a horizontal or directional well. The formation 104 may be made up of several zones which may include oil reservoirs. In certain example embodiments, the well system 100 may include a production tree 108 and a wellhead 109 located at a well site 106. A production tubing 112 extends from the wellhead 109 into the well 102. The production tubing 112 includes a plurality of perforations 126 through which fluids from the formation 104 can enter the production tubing 112 and flow upward into the production tree 108.

In some embodiments, the wellbore 102 is cased with one or more casing segments 130. The casing segments 130 help maintain the structure of the well 102 and prevent the well 102 from collapsing in on itself. In some embodiments, a portion of the well is not cased and may be referred to as "open hole." The space between the production tubing 112 and the casing 130 or wellbore 102 is an annulus 110. Production fluids enter the annulus 110 from the formation 104 and then enter the production tubing 112 from the annulus 110. Production fluid enters the production tree 108 from the production tubing 112. The production fluid is then delivered to various surface facilities for processing via a surface pipeline 114. It should be appreciated that well system 100 is only an example well system and there are many other well system configurations which may also be appropriate for use.

A downhole inductive connection system 140 is also deployed downhole, and in one or more embodiments, is coupled to the production tubing 112. In certain such embodiments, the connection system 140 is coupled to a mandrel 150, in which the mandrel 150 is a segment of the production tubing 112. In one or more other embodiments, the system 140 is coupled directly to production tubing 112. The connection system 140 includes a cable 142 including a surface end 144 extending uphole and electrically coupled to a control system 160 at the work site 106. The cable 142 also includes a coupling end 146 extending downhole, at which the cable 142 is electrically and mechanically coupled to an inductive coupler 148. The connection system 140 further includes a downhole electrical device 152, which is coupled to another inductive coupler 154. The electrical device 152 is thus inductively coupled to the inductive coupler 148 of the cable 142. Data and/or power are transmittable between the cable 142 and the electrical device 152 via the inductive couplers 148, 154, which may serve as inductive transceivers.

The downhole inductive connection system 150 can be deployed downhole in a time-efficient manner, with minimal stop time since connections between the inductive coupler 148 and the cable 132 and between the inductive coupler 154 and the electrical device 152 can be made and pressure tested ahead of time. Thus, in one or more embodiments, a method of deploying the connection system 140 downhole includes coupling a tubing segment, such as the mandrel 150, to a downhole tubing string 112a, which may include one or more interconnected tubing segments. The tubing segment may include the electrical device 152 already coupled thereto, where the electrical device 152 is electrically coupled to and pressure sealed with the inductive coupler 154.

The cable 142 with the inductive coupler 148 is then coupled to the tubing segment within electromagnetic range of the inductive coupler 154 of the electrical device 152, wherein the cable head is previously electrically coupled to and pressure sealed with a cable inductive coupler. The tubing segment is then lowered downhole with the downhole tubing string 112a.

Although FIG. 1 illustrates a production operation, it should be appreciated that the systems and techniques presented in this disclosure may also be applied to an injection operation, drilling operation or logging/evaluation operation, in which the connection system 140 is coupled to drilling pipe, wireline cable, coiled tubing, or the like rather than production tubing.

Figure 2B:
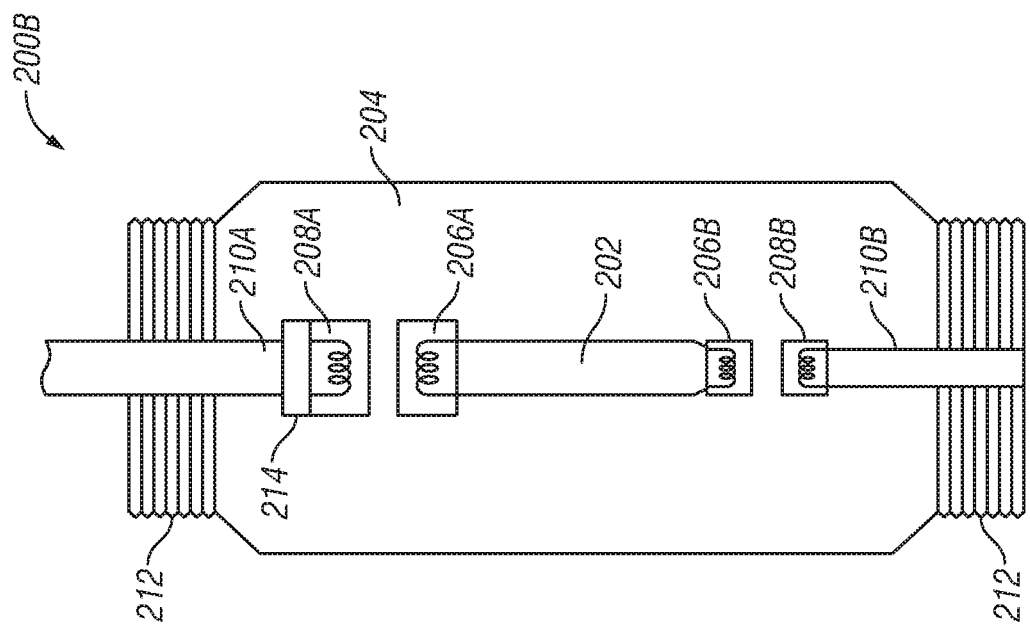
FIGS. 2A and B are diagrammatical views of inductive connection systems, in accordance with one or more embodiments.
Figure 2A:
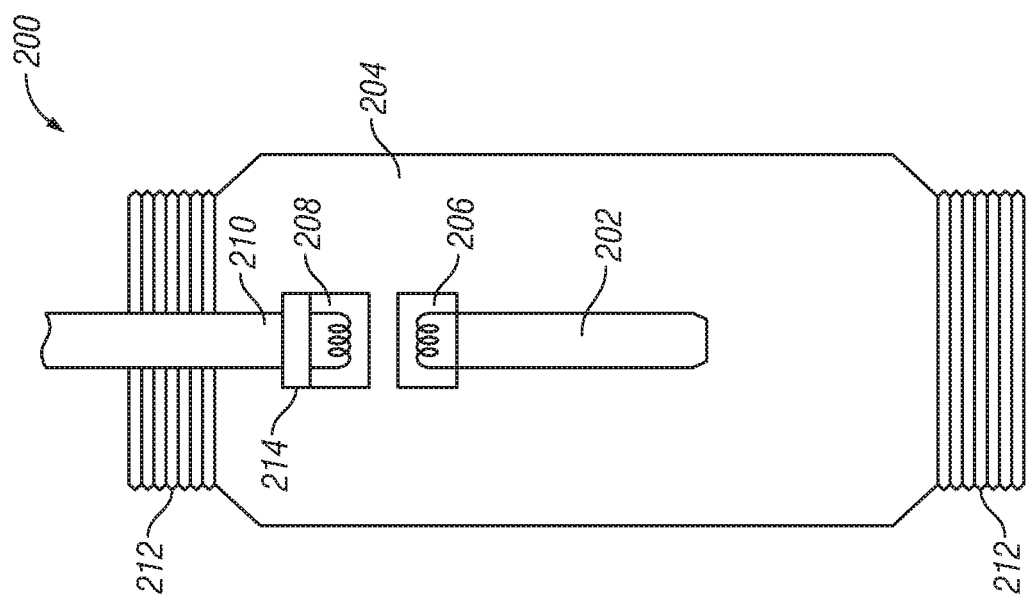

FIG. 2A is a schematic view of one embodiment of an inductive connection system 200. In this embodiment, an electrical device 202 is coupled to a mandrel 204. The mandrel 204 includes coupling ends 212 (e.g., threaded ends) for coupling to downhole and uphole segments of the production tubing 112 (FIG. 1), and thereby makes up a portion of the production tubing string 112.

The electrical device 202 is also electrically and mechanically coupled to an inductive coupler 206, in which the inductive coupler 206 is pressure sealed to or pressure balanced with the electrical device 202. In one or more embodiments, the inductive coupler 206 is built into and integral with the electrical device 202, and thus provides one sealed device. In one or more other embodiments, the inductive coupler 206 is attached to the electrical device 202 as an add-on unit and pressure sealed to or pressure balanced with the electrical device 202. In such embodiments, the connection between the inductive coupler 206 and the electrical device 202 is pressure tested prior to the being installed on the mandrel 204 or prior to the run-in-hole operation. The system 200 further includes a cable 210 which extends from the surface. The cable 210 is also electrically and mechanically coupled to an inductive coupler 208, in which the inductive coupler 208 of the cable 210 is communicable with the inductive coupler 206 of the electrical device 202, thereby providing a means of transmitting power, data, or both between the cable 210 and the electrical device 202.

The inductive coupler 208 may be built into or integral with a cable head 214 of the cable 210, and thus forms one sealed device. The inductive coupler 208 may also be coupled to the cable head 214 as an add-on unit and pressure sealed with a cable head 214. This connection can be made and pressure tested prior to the run-in-hole operation or in tandem with an earlier part of the run-in-hole operation such that the cable 210 with inductive coupler 208 are ready to be run in hole with the associated segment of the production tubing without pausing the run-in-hole operation for pressure testing. Thus, during the run-in-hole operation, the cable 210 with the inductive coupler 208 is simply coupled to the mandrel 212 as the mandrel is connected to the downhole portion of the production tubing 112. The mandrel 212 already includes the electrical device 202 and inductive coupler 206 coupled thereto and the inductive coupler 208 of the cable is placed within a communicable vicinity of the inductive coupler 206 of the electrical device 202. Since no physical connection is required between the inductive couplers 206, 208, no pressure testing is required. Thus, minimal stop time is required to connect and run the system 200 downhole.

In an example use case, the cable 210 sends a first electrical signal to the inductive coupler 208, which generates a current across the inductive coupler 208, thereby generating an electromagnetic field. The electromagnetic field induces a voltage across the inductive coupler 206 of the electrical device 202 and a second electrical signal is sent to the electrical device 202, in which the second electrical signal is representative of the first electrical signal. Communication is thereby established between the cable and electrical device 202.

The electrical device 202 may include a sensor configured to take measurements of one or more downhole conditions such as temperature, pressure, moisture, fluid composition, vibration, position and orientation in a well, and the like. Accordingly, the sensor may include at least one of a temperature sensor, a pressure sensor, a moisture sensor, a spectrometer, a flow meter, an accelerometer, a magnetometer, a gravimeter, a strain gauge, a load cell, an electromagnetic receiver, and the like. The sensor may include single or dual type sensors which have more than one sensed input. The sensor may also include a multi-point sensing system with sub-sensors placed in different locations. As a non-limiting example, the electrical device 202 may be a ROC' permanent downhole gauge available from Halliburton Energy Services, Inc., of Houston, Tex. The ROC' gauge may be deployed on a production tubing string (e.g., the production tubing 112 of FIG. 1) for production monitoring, reservoir monitoring, completion system optimization, and artificial lift optimization. The ROC' gauge may include one or more temperature and pressure sensors for monitoring the production system. The electrical device 202 may also include an actuation device, such as but not limited to a valve, solenoid, piston, sleeve, pump, magnetorestrictive device, electric motor, piezoelectric device, electromagnetic transducer, or any other suitable device configured to convert electrical energy into mechanical energy, among others.

Figure 3:
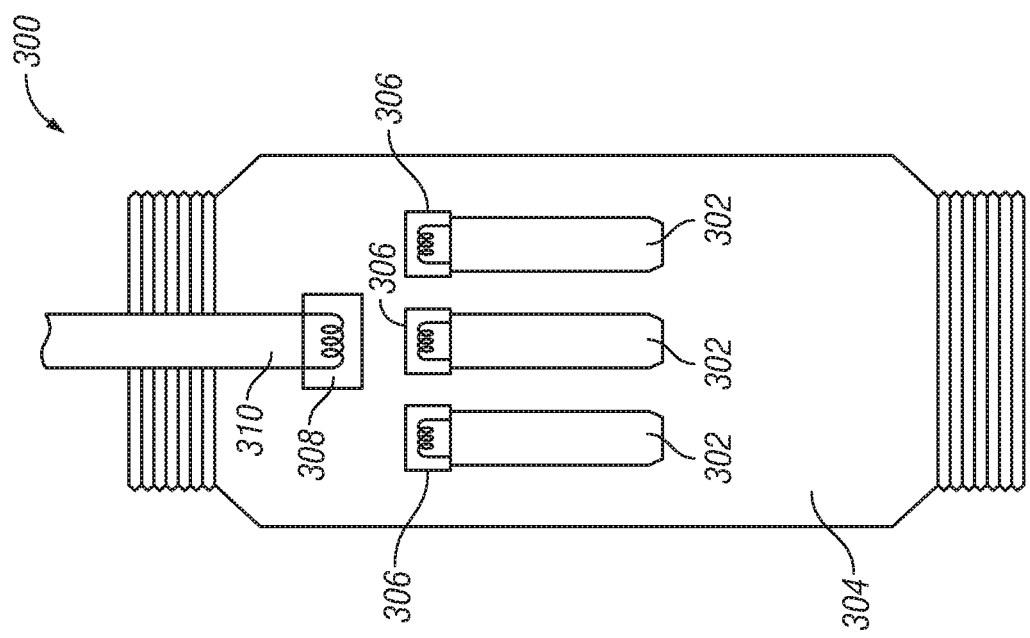
FIG. 3 is a diagrammatical view of an embodiment of an electrical connection system comprising a plurality of electrical devices, each of which is coupled to a unique inductive coupler, in accordance with one or more embodiments.

It should be appreciated that the electrical device 202 may have more than one inductive coupler 206 that inductively couples to one or more electrical devices or one or more cables with respective inductive couplers. For example, FIG. 2B shows a schematic view of the electrical device 202 including more than one inductive coupler 206A and B, in accordance with one or more embodiments. As shown, the additional inductive coupler 206B allows the electrical device 202 to serve as a feedthrough component such that data and/or power pass through the electrical device 202 to an additional cable 210B via the inductive coupler 208B. FIG. 3 illustrates an embodiment of an electrical connection system 300 comprising a plurality of electrical devices 302, each of which is coupled to a unique inductive coupler 306. In this embodiment, all of the inductive couplers 306 communicate with one inductive coupler 308 coupled to a cable 310. For example, the different inductive couplers 306 coupled to the electrical devices 302 may communicate via a wide variety of modulation schemes, including but not limited to amplitude shift keying, frequency shift keying, phase shift keying, or any other suitable modulation scheme, which allow the signals to be received or transmitted through the same inductive coupler 308 and then decoded into the respective signals.

Figure 4:
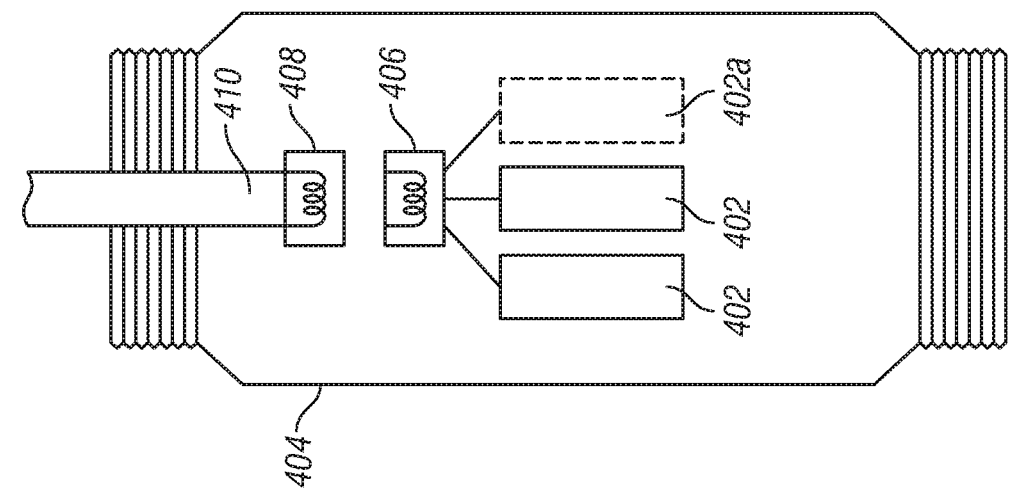
FIG. 4 is a diagrammatical view an embodiment of an electrical connection system comprising a plurality of electrical devices, all of which are coupled to the same inductive coupler, in accordance with one or more embodiments.

FIG. 4 illustrates an embodiment of an electrical connection system 400 comprising a plurality of electrical devices 402, all of which are coupled to the same inductive coupler 406. The separate signals from the electrical device 402 may be encoded into a single transmission signal that is transmitted to the cable via the inductive couplers 406, 408. The signal received by the cable 410 is sent to the control system 150 (FIG. 1) where the signal is decoded into the respective data from each electrical device 402. The inductive couplers 406, 408 may also provide bi-directional communication between the electrical devices 402 and the cable 410.

In one or more embodiments, the electrical devices 402 may sense a condition outside of the mandrel 404. One or more electrical device 402a may also be located inside the mandrel 404 and thus sense one or more conditions from inside or outside of the mandrel 404. The electrical devices 402 may be in fluid communication with the exterior or the interior of the mandrel 404 to sense one or more conditions through the mandrel 404. For example, the electrical device 402a may in fluid communication with the exterior of the mandrel 404 via a channel to measure a condition outside the mandrel 404. The condition sensed by the electrical devices 402 may include, but is not limited to, a temperature, pressure, flow rate, among others.

Inductive coupling means can be integrated into the communication interface between a cable and a downhole electrical device in several ways, as illustrated in FIGS. 5A-5E. Specifically, the embodiment of FIG. 5A includes a cable head 514 coupled to a cable 510. An inductive coupler 508 is coupled to the cable head 514 as an add-on unit. Similarly, an inductive coupler 506 is coupled to an electrical device 502 as an add-on unit, in which the inductive couplers 506, 508 are communicable with each other. With the inductive couplers 506, 508 as add-on units, the cable 510 and the electrical device 502 may be retrofitted for inductive communication.

Figure 5A:
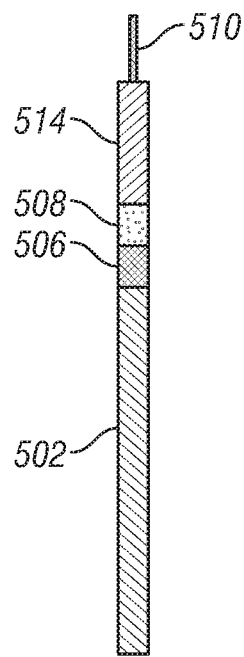
FIG. 5A is a diagram view of an electrical connection system with inductive couplers as add-on units, in accordance with one or more embodiments.
Figure 5B:
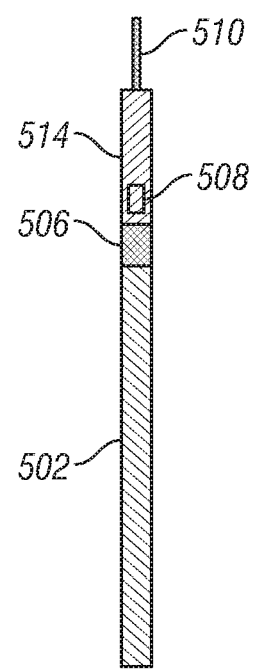
FIG. 5B is a diagram view of an electrical connection system in which an inductive coupler is built in or integrated within a cable head and an inductive coupler is coupled to an electrical device as a pressure sealed add-on unit, in accordance with one or more embodiments.
Figure 5C:
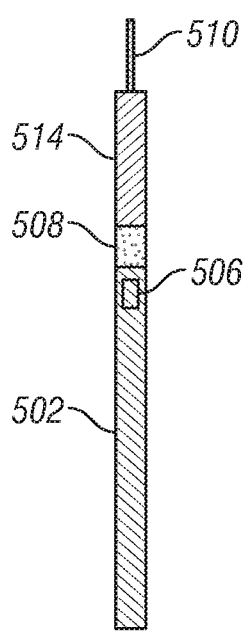
FIG. 5C is a diagram view of an electrical connection system in which an inductive coupler is built in or integrated within an electrical device and an inductive coupler is coupled to a cable head as a pressure sealed add-on unit, in accordance with one or more embodiments.
Figure 5D:
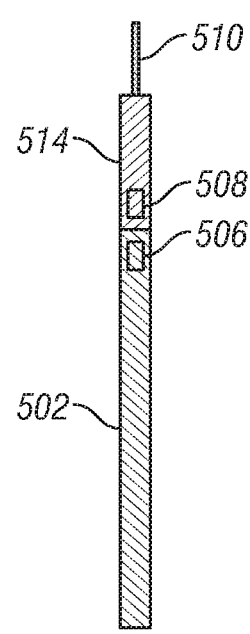
FIG. 5D is a diagram view of an electrical connection system in which an inductive coupler is built in or integrated within an electrical device and another inductive coupler is built in or integrated within a cable head, in accordance with one or more embodiments.
Figure 5E:
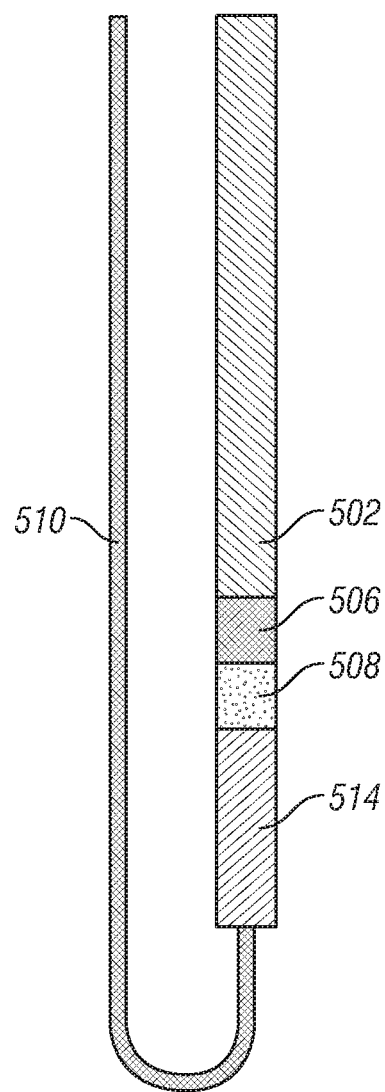
FIG. 5E shows a diagram view of an electrical connection system inductive couplers as add-on units with a cable inductively coupled to the bottom of an electrical device, in accordance with one or more embodiments.

FIG. 5B illustrates an embodiment in which the inductive coupler 508 is built in or integral with the cable head 514 and the inductive coupler 506 is coupled to the electrical device 502 as a pressure sealed add-on unit. As shown, the electrical device 502 may be retrofitted for inductive communication with the cable 510. FIG. 5C illustrates an embodiment in which the inductive coupler 506 is built in or integral with the electrical device 502 and the inductive coupler 508 is coupled to the cable head 514 as a pressure sealed add-on unit. As shown, the cable 512 may be retrofitted for inductive communication with the electrical device 502. FIG. 5D illustrates an embodiment in which the inductive coupler 506 is built in or integral with the electrical device 502 and the inductive coupler 508 is built in or integral with the the cable head 514. Each of the inductive couplers 506, 508 can include a transmitter, receiver, or both. The inductive coupler 506 may also be positioned or coupled in a wide variety of locations on the electrical device 502. For example, FIG. 5E shows a diagram view of the inductive coupler 506 coupled to the bottom of the electrical device 502, such that the cable 510 is run alongside the electrical device 502 and inductively coupled to the electrical device 502 via the inductive couplers 506, 508.

Figure 6A:
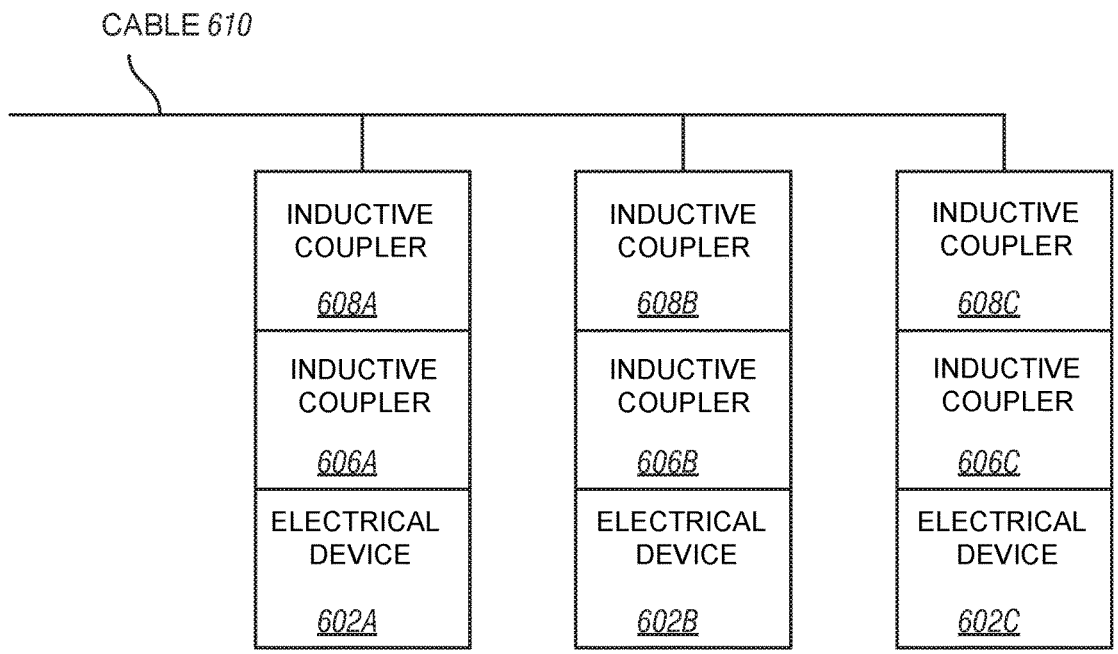
FIGS. 6A and B show diagram views of electrical connection systems connected in parallel and series, respectively, in accordance with one or more embodiments.
Figure 6B:
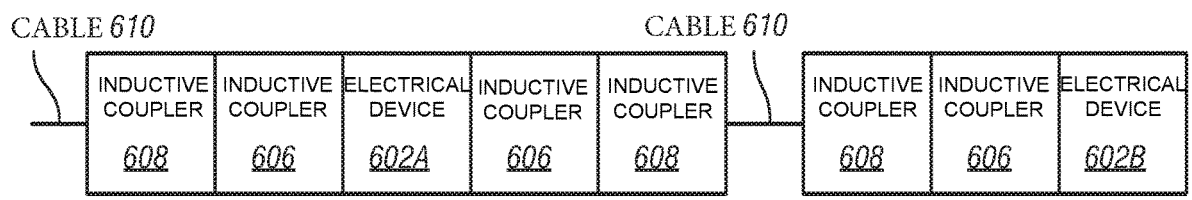

A communication network may also be formed with the connection systems discussed herein including a combination of inductive couplers, electrical devices, or cables. The communication network may be formed with the electrical devices 202 inductively coupled in parallel, series, or a combination thereof. For example, FIG. 6A shows a diagram view of the electrical devices 602A-C connected in a parallel along the cable 610 via inductive couplers 606A-C, 608A-C, in accordance with one or more embodiments. FIG. 6B shows a diagram view of the electrical devices 602A, 602B connected in series with multiple inductive couplers 606, 608 and cables 610, in accordance with one or more embodiments. Other suitable communication networks may be formed with the connection systems described herein including but not limited to a ring network, a mesh network, a star network, a tree network, a linear bus network, a point-to-point network, or a combination thereof.

In addition to the embodiments described above, many examples of specific combinations are within the scope of the disclosure, some of which are detailed below:

Example 1

A downhole inductive coupling system, comprising:
a cable;
a cable inductive coupler electrically and mechanically coupled to an end of the cable and pressure sealed to the cable;
a downhole electrical device;
a device inductive coupler electrically and mechanically coupled to the electrical device and pressure sealed to the downhole device; and
wherein the cable inductive coupler and the device inductive coupler are inductively coupleable with each other, such that the cable is in wireless communication with the downhole electrical device via the cable inductive coupler and the device inductive coupler.

Example 2

The system of example 1, wherein the cable, the cable inductive coupler, the downhole electrical device, and the device inductive coupler are coupled to a mandrel, wherein the mandrel is coupleable to downhole tubing.

Example 3

The system of example 2, wherein the downhole electrical device is a sensor configured to sense a condition outside of the downhole tubing, inside the downhole tubing, or both.

Example 4

The system of example 1, wherein the cable, the cable inductive coupler, the downhole electrical device, and the device inductive coupler are coupled to downhole tubing.

Example 5

The system of example 1, further comprising a plurality of downhole electrical devices, each of which is coupled to a unique device inductive coupler.

Example 6

The system of example 1, further comprising a plurality of downhole electrical devices coupled to the same device inductive coupler.

Example 7

The system of example 1, wherein the downhole electrical device comprises at least one of an actuation device, a sensor, a valve, a sleeve, a pump, a piston, or any combination thereof.

Example 8

The system of example 1, wherein the cable inductive coupler is integral with a cable head of the cable.

Example 9

The system of example 1, wherein the device inductive coupler is integral with the downhole electrical device.

Example 10

The system of example 1, wherein the cable inductive coupler is coupled to a cable head of the cable as an add-on unit.

Example 11

The system of example 1, wherein the device inductive coupler is coupled to the electrical device as an add-on unit.

Example 12

The system of example 7, wherein the sensor includes at least one of a temperature sensor, a pressure sensor, a moisture sensor, a flow meter, an accelerometer, a gravimeter, a gravitometer, a strain gauge, and a load cell.

Example 13

The system of example 1, wherein at least one of data and power is wirelessly transmittable between the cable and the downhole electrical device.

Example 14

A method of deploying an electrically connected system downhole, comprising:
coupling a tubing segment to a downhole tubing string, wherein the tubing segment includes an electrical device coupled thereto, the electrical device electrically coupled to and pressure sealed with a device inductive coupler;
coupling a cable head onto the tubing segment within electromagnetic range of the device inductive coupler, wherein the cable head is electrically coupled to and pressure sealed with a cable inductive coupler; and
lowering the tubing segment coupled to the downhole tubing string further downhole.

Example 15

The method of example 14, further comprising coupling the cable head to the inductive coupler and pressure testing the connection prior to coupling the tubing segment to the downhole tubing string.

Example 16

The method of example 14, further comprising mounting the electrical device to the tubing segment prior to coupling the tubing segment to the downhole tubing string.

Example 17

The method of example 14, further comprising pressure testing a connection between the cable head and the cable inductive coupled or pressure testing a connection between the electrical device and the device inductive coupler, or both, prior to coupling the tubing segment to the downhole tubing string.

Example 18

The method of example 14, further comprising wirelessly transmitting at least one of data and power between the cable and the downhole electrical device via the cable inductive coupler and the device inductive coupler.

Example 19

The method of example 14, wherein the tubing segment includes an additional electrical device coupled thereto, the additional electrical device electrically coupled to and pressure sealed with an additional device inductive coupler within electromagnetic range of the cable inductive coupler.

Example 20

The method of example 14, wherein the tubing segment includes an additional electrical device coupled thereto, the additional electrical device electrically coupled to and pressure sealed with the device inductive coupler.

Example 21

A method of transmitting electrical signals between downhole components, comprising:
sending a transmitted electrical signal from a first electrical component to a transmitting inductive coupler, wherein the transmitting inductive coupler is pressure sealed to the first electrical component and coupled to a tubing segment;
generating a current across the transmitting inductive coupler, thereby generating an electromagnetic field;
inducing a voltage across a receiving inductive coupler via the electromagnetic field, wherein the receiving inductive coupler is pressure sealed to a second electrical component and coupled to the tubing segment; and sending a received electrical signal from the receiving inductive coupler to the second electrical component, wherein the received electrical signal is representative of the transmitted electrical signal, thereby establishing wireless communication between the first electrical component and the second electrical component.

Example 22

The method of example 21, further comprising transmitting power, data, or both, between the first electrical component and the second electrical component.

Example 23

The method of example 21, further comprising inducing a voltage across a plurality of receiving inductive couplers.

Example 24

The method of example 21, wherein the first electrical component is a cable, and the second electrical device comprises at least one of an actuation device, a sensor, a valve, a sleeve, a pump, a piston, or any combination thereof.

Example 25

The method of example 21, wherein the receiving inductive coupler is pressure sealed to an additional electrical component, and wherein sending the received electrical signal further comprises sending the received electrical signal from the receiving inductive coupler to the additional electrical component.

This discussion is directed to various embodiments of the present disclosure. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis.

The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A downhole inductive coupling system for use with a downhole tool positionable in a wellbore, comprising:
   a cable coupleable to the downhole tool and comprising a cable inductive coupler electrically and mechanically connected to an end of the cable and pressure sealed to the cable, wherein the cable inductive coupler is pressure sealed to the cable and a connection between the cable and the cable inductive coupler is pressure testable prior to the cable inductive coupler being coupled to the downhole tool and positioned within the wellbore;
   a downhole electrical device coupleable to the downhole tool and comprising a device inductive coupler electrically and mechanically coupled to the downhole electrical device and pressure sealed to the downhole electrical device;
   wherein the cable inductive coupler and the device inductive coupler are inductively coupleable with each other, such that the cable is in wireless communication with the downhole electrical device via the cable inductive coupler and the device inductive coupler;
   wherein the cable transmits an electrical signal to the cable inductive coupler, and the device inductive coupler receives the electrical signal that is transmitted to the downhole electrical device, thereby generating a current across the cable inductive coupler, generating an electromagnetic field, and establishing the wireless communication between the cable and the downhole electrical device;
   wherein data and power is wirelessly transmittable between the cable and the downhole electrical device; and
   wherein the downhole tool includes an additional electrical device coupled thereto, the additional electrical device electrically coupled to and pressure sealed with an additional device inductive coupler within electromagnetic range of the cable inductive coupler.

2. The system of claim 1, wherein the downhole tool is a mandrel, wherein the mandrel is coupleable to downhole tubing.

3. The system of claim 2, wherein the downhole electrical device is a sensor configured to sense a condition outside of the downhole tubing, inside the downhole tubing, or both.

4. The system of claim 1, wherein the downhole tool is downhole tubing.

5. The system of claim 1, further comprising a plurality of downhole electrical devices, wherein each of the downhole electrical devices is coupled to a unique device inductive coupler, or to same device inductive coupler.

6. The system of claim 1, wherein the downhole electrical device comprises at least one of an actuation device, a sensor, a valve, a sleeve, a pump, a piston, or any combination thereof.

7. The system of claim 6, wherein the sensor includes at least one of a temperature sensor, a pressure sensor, a moisture sensor, a flow meter, an accelerometer, a gravimeter, a gravitometer, a strain gauge, and a load cell.

8. The system of claim 1, wherein the cable inductive coupler is integral with a cable head of the cable, or the device inductive coupler is integral with the downhole electrical device.

9. The system of claim 1, wherein the cable inductive coupler is coupled to a cable head of the cable as an add-on unit.

10. The system of claim 1, wherein the device inductive coupler is coupled to the downhole electrical device as an add-on unit.

11. A method of deploying an electrically connected system within a wellbore, comprising:
    electrically and mechanically connecting and pressuring sealing a cable head to a cable inductive coupler; then
    pressure testing the connection between the cable head and the cable inductive coupler, then
    coupling the cable head onto a tubing segment; then
    coupling the tubing segment to a downhole tubing string, wherein the downhole tubing string includes an electrical device coupled thereto, the electrical device electrically and mechanically coupled to and pressure sealed with a device inductive coupler; and then
    lowering the tubing segment coupled to the downhole tubing string into the wellbore;
    pressure testing a connection between the electrical device and the device inductive coupler prior to said coupling the tubing segment to the downhole tubing string; and
    sending an electrical signal from the cable head to the cable inductive coupler;
    generating a current across the cable inductive coupler, thereby generating an electromagnetic field;
    sending the electrical signal from the cable inductive coupler to the device inductive coupler, and receiving the electrical signal at the electrical device, thereby establishing a wireless communication between the cable head and the electrical device;
    wirelessly transmitting data and power between the tubing segment and the electrical device via the cable inductive coupler and the device inductive coupler; and
    wherein the tubing segment includes an additional electrical device coupled thereto, the additional electrical device electrically and mechanically coupled to and pressure sealed with an additional device inductive coupler within electromagnetic range of the cable inductive coupler.

12. The method of claim 11, wherein the tubing segment further includes another additional electrical device coupled thereto, the other additional electrical device electrically coupled to and pressure sealed with the device inductive coupler.

13. A method of transmitting electrical signals between downhole components within a wellbore, comprising:
    electrically and mechanically connecting and pressure sealing a cable with a transmitting inductive coupler prior to the cable being coupled to a tubing segment and positioned within the wellbore; then
    pressure testing the connection between the cable and the transmitting inductive coupler prior to the cable being coupled to the tubing segment and positioned within the wellbore; then
    transmitting an electrical signal from the cable to the transmitting inductive coupler;
    generating a current across the transmitting inductive coupler, thereby generating an electromagnetic field;
    inducing a voltage across a receiving inductive coupler via the electromagnetic field, wherein the receiving inductive coupler is pressure sealed, electrically and mechanically connected to an electrical component and coupled to the tubing segment;
    transmitting the electrical signal from the transmitting inductive coupler to the receiving inductive coupler;
    sending the electrical signal from the receiving inductive coupler to the electrical component, thereby establishing wireless communication between the cable and the electrical component;
    transmitting power and data between the cable and the electrical component; and
    wherein the receiving inductive coupler is pressure sealed, electrically and mechanically connected to an additional electrical component, and wherein said sending the electrical signal from the receiving inductive coupler to the additional electrical component.

14. The method of claim 13, further comprising inducing a voltage across a plurality of receiving inductive couplers.

15. The method of claim 13, wherein the electrical component comprises at least one of an actuation device, a sensor, a valve, a sleeve, a pump, a piston, or any combination thereof.

* * * * *